(12) United States Patent
Mousa

(10) Patent No.: US 8,087,119 B2
(45) Date of Patent: Jan. 3, 2012

(54) PIPELINE PIG WITH INTERNAL FLOW CAVITY

(75) Inventor: Ali Ateyeh Mohammad Mousa, Mazrooeyah (SA)

(73) Assignee: Saudi Arabian Oil Company (SA)

( * ) Notice: Subject to any disclaimer, the term of this patent is extended or adjusted under 35 U.S.C. 154(b) by 404 days.

(21) Appl. No.: 12/327,656

(22) Filed: Dec. 3, 2008

(65) Prior Publication Data

US 2010/0132737 A1   Jun. 3, 2010

(51) Int. Cl.
*B08B 9/055* (2006.01)

(52) U.S. Cl. ....................................... 15/104.061; 134/8

(58) Field of Classification Search .. 134/8; 15/104.061
See application file for complete search history.

(56) References Cited

U.S. PATENT DOCUMENTS

| 3,785,611 | A | * | 1/1974 | Di Sabatino, Jr. | 251/25 |
| 4,498,932 | A | | 2/1985 | Kruka | |
| 4,590,799 | A | | 5/1986 | Brown et al. | |
| 5,208,936 | A | | 5/1993 | Campbell | |
| 6,098,231 | A | * | 8/2000 | Smith et al. | 15/104.061 |
| 6,122,791 | A | | 9/2000 | Baugh et al. | |
| 6,190,090 | B1 | * | 2/2001 | Campbell et al. | 405/211.1 |
| 6,370,721 | B1 | | 4/2002 | Torres, Jr. et al. | |
| 6,500,271 | B1 | * | 12/2002 | Moore et al. | 134/8 |
| 6,679,129 | B2 | | 1/2004 | Savard | |
| 6,965,320 | B1 | * | 11/2005 | Casey et al. | 340/870.07 |
| 2003/0056309 | A1 | | 3/2003 | Savard | |
| 2007/0286682 | A1 | | 12/2007 | Freyer et al. | |

FOREIGN PATENT DOCUMENTS

| CA | 2416396 | 7/2004 |
| DE | 10338950 A1 | 6/2005 |
| JP | 2001353477 | 12/2001 |
| WO | 2009/017419 | 2/2009 |

* cited by examiner

*Primary Examiner* — Michael Kornakov
*Assistant Examiner* — Douglas Lee
(74) *Attorney, Agent, or Firm* — Bracewell & Giuliani LLP

(57) ABSTRACT

A pig for movement within a pipeline comprising a cylindrical housing with annular seals circumferentially mounted to the housing and extending outwards for sealing engagement between the pipeline and the housing. An internal flow cavity passes through the housing, with a gate positioned within the internal flow cavity, initially obstructing flow through the cavity. A locking device, connected to the gate, prevents the gate opening. A sensing device is capable of receiving a signal and is connected to an unlocking device. The sensing device receives a signal activating the unlocking device, thereby removing the locking device, permitting the gate to open and flow to pass through the cavity.

17 Claims, 2 Drawing Sheets

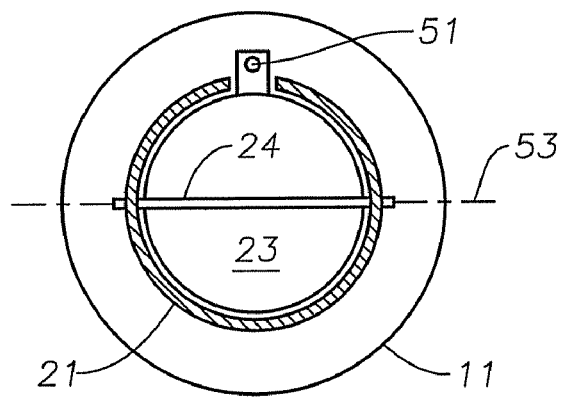 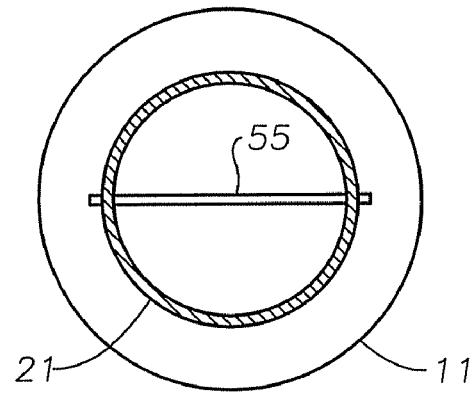
Fig. 4                    Fig. 6
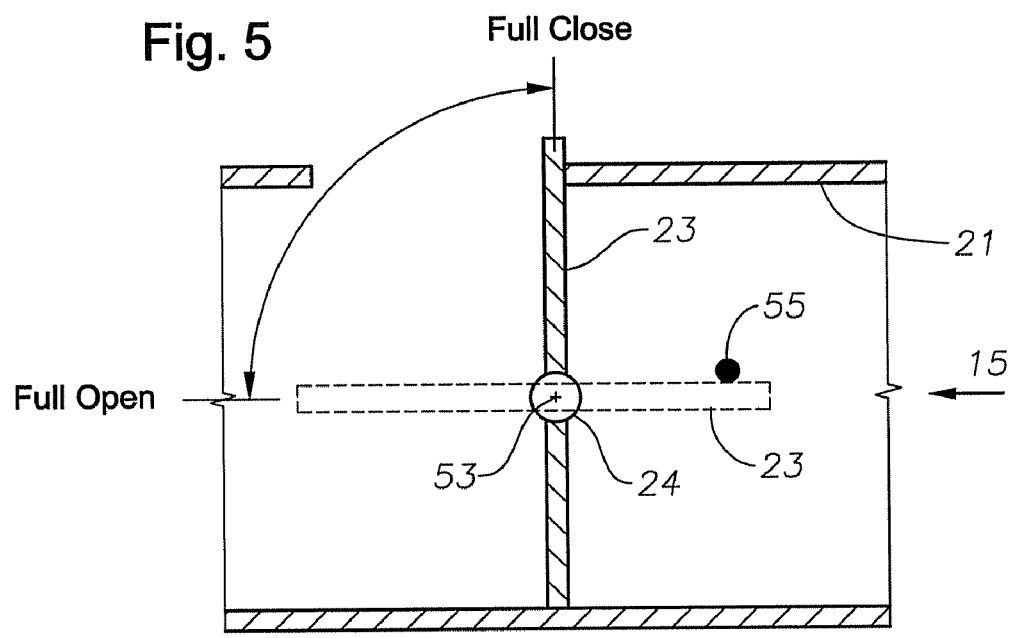
Fig. 5

PIPELINE PIG WITH INTERNAL FLOW CAVITY

FIELD OF THE INVENTION

This disclosure relates to pipeline pigs used in the inspection of pipelines.

BACKGROUND

Devices known as pigs are commonly passed through pipelines in order to service or inspect the pipeline. A pig may contain the necessary servicing or inspection equipment or may draw other devices behind it. In pipelines for conveying fluids, the pig is commonly driven along the pipeline by the flow of the pipeline fluid. To achieve this, the pig may be fitted with one or more flexible disks or cups attached to the body of the pig and extending outwardly to the interior pipe wall so as to form a sufficient seal in the pipeline. Such arrangements have been known and used for many years. If the seal is substantially complete, the pig will travel at the speed of the pipeline fluid.

If a pig becomes stuck in a pipeline, it can restrict or impede the flow through the pipeline. Often, contingency plans are implemented in order to recover the pig. Contingency plans may involve shutting down the pipeline, depressurizing the pipeline, flushing the pipeline, lifting the pipeline, and cutting the pipeline at the point where the pig is stuck in order to remove it. Once the pig is removed, the pipeline is then reconnected and put back in service. This contingency plan is costly due to inhibited pipeline flow and downtime while the pipeline is cleared. A by-pass pig with holes that allow some flow through can be used in place of a traditional pipeline pig. However, the holes in a by-pass pig reduce the maximum fluid force that can be applied to the pig to drive it through the pipeline. As a result, the chances of a by-pass pig becoming stuck in a pipeline are greater than that of a traditional pipeline pig.

SUMMARY OF THE INVENTION

In accordance with the invention, there is provided a pipeline pig with an internal flow cavity that runs through the center of the body. A swingable gate, similar to a butterfly valve, is located within the center pipe. The gate has a locking mechanism to keep it in the closed position. The pig also includes a hydraulic accumulator that stores hydraulic oil, and at least one hydraulic cutter. A control capsule consisting of a pressure switch, a battery, and a solenoid valve are contained within a high pressure housing in the body of the pig. If the pig becomes stuck within the pipeline, the pressure is increased within the pipeline. As the pressure is increased, the pressure switch located in the pig triggers the solenoid valve. The solenoid valve opens, allowing the hydraulic oil to flow to the hydraulic cutter. The hydraulic cutter cuts the gate locking device, allowing the gate to rotate, thereby opening the internal flow cavity, allowing flow to continue through the pipeline. Additionally, a pinger can be located within the body of the pig, allowing the location of the pig in the pipeline to be monitored and determined.

BRIEF DESCRIPTION OF THE DRAWINGS

FIG. 4 is a cross-sectional view taken along the line 4-4 of FIG. 1.

FIG. 5 is an enlarged view of the pipeline pig of FIG. 1, illustrating the movement of the gate of the pipeline pig as comprised by the present invention.

FIG. 6 is a cross-sectional view taken along the line 6-6 of FIG. 1.

DETAILED DESCRIPTION OF THE INVENTION

Figure 1:
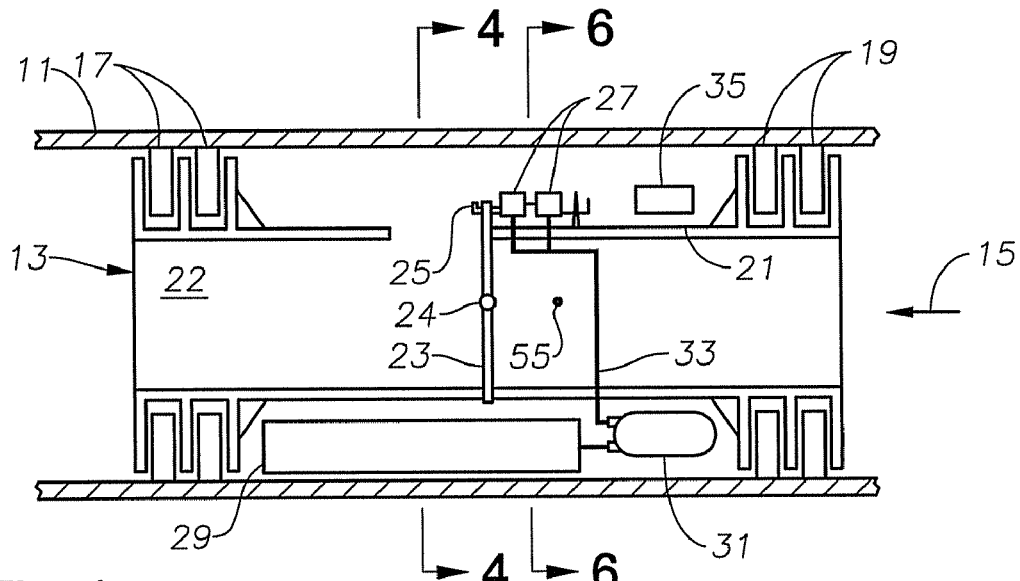
FIG. 1 is a cross-sectional side view of a pipeline pig as comprised by the present invention.

Referring to FIG. 1, a pipeline pig 13 is constructed in accordance with the present invention. Pipeline pig 13 consists of a housing or body 21. A passageway or internal flow cavity 22 extends through the center of body 21. A gate 23 is located in the center of flow cavity 22 of pipeline pig 13 equidistant between each end. Gate 23 is mounted to a shaft 24 that is perpendicular to internal flow cavity 22. Gate 23 and shaft 24 are both capable of rotation, but are limited by a stopper 55. A plurality of bracketed front guide discs 17, and bracketed rear guide discs 19 are disposed about body 21. Guide discs 17, 19 contact the pipeline walls 11 to scrape them of deposits and guide the pig 13 through the pipeline as the fluid flow as indicated by arrow 15 pushes the pig. A hydraulic accumulator 29, a high pressure capsule 31, at least one hydraulic cutter 27 connected to high pressure capsule 31 by a fluid control line 33, and a locking pin 25 are located within or mounted to body 21 of pipeline pig 13, but outside of flow cavity 22. A pipeline pinger 35 may also be located within or mounted to body 21 of pipeline pig 13 and may be used to determine the location of pig 13 throughout its deployment in the pipeline.

Figure 2:
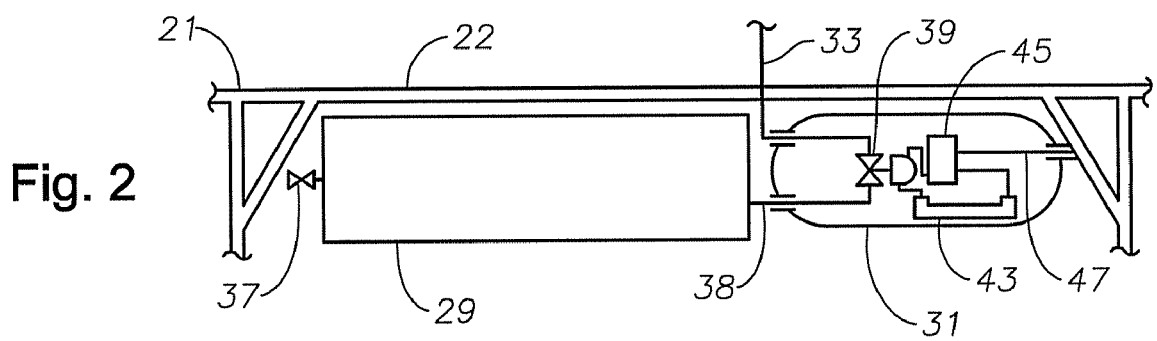
FIG. 2 is an enlarged view of a portion of the pipeline pig of FIG. 1.

Referring to FIG. 2, a hydraulic accumulator 29 is connected to high pressure capsule 31. Encapsulated in high pressure capsule 31, in order to sustain the pressure of the pipeline, are a solenoid valve 39, a battery 43, and a pressure switch 45. Pressure switch 45 could be replaced by a number of other sensing devices capable of receiving a signal including a magnetic signal, an electronic signal, an acoustic signal, and ultrasonic signal, or other through-wall communication. Additionally, pressure switch 45 could be replaced by a timer. Hydraulic accumulator 29 stores hydraulic oil and has a check valve 37 on one end for charging. A hydraulic control line 38 extends from accumulator 29 into capsule 31 and into solenoid valve 39. Solenoid valve 39 is connected to battery 43, which is also connected to pressure switch 45. A sensor line 47 runs from pressure switch 45 and out an opening in capsule 21. Pressure switch 45 is connected to solenoid valve 39. Control line 33 runs from solenoid valve 39 and out of high pressure capsule 31.

Figure 3:
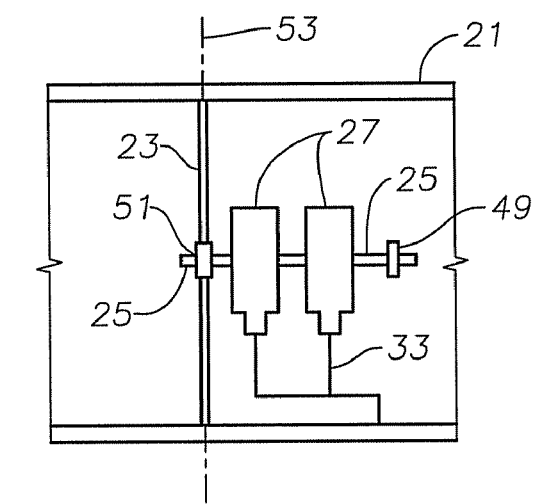
FIG. 3 is a top view of the locking mechanism cutting assembly of the pipeline pig as comprised by the present invention.

Referring to FIGS. 1 and 3, control line 33 runs to hydraulic cutters 27. In the present embodiment, there are two hydraulic cutters 27, but there may be more or less located within a given pig. Locking rod 25 passes through holes in hydraulic cutters 27 and is fixed to the pig housing 21 by a bracket 49. Opposite bracket 49, locking rod 25 passes through a hole 51 before bending upwards. Hole 51 extends through a tab which extends upwards from gate 23 beyond housing 21 (FIGS. 4 and 5). The contact surfaces between gate 23 and housing 21 are initially sealed. Rod 25 prevents rotation of gate 23 about its axis 53. Referring to FIG. 6, a stopper rod 55 extends across internal cavity 22 through the center of body 21 and is positioned parallel to axis 53 rearward of gate 23 (FIG. 5). Referring to FIGS. 4 and 5, stopper rod 55 limits the rotational path of gate 23 to 90 degrees from the closed position.

Referring back to FIG. 1, in operation, pipeline pig 13 is deployed within pipeline 11. Gate 23 is in a closed position, and is locked in position by locking rod 25, which passes through hole 51 on the tab portion of gate 23. Pig 13 is pushed through pipeline 11 by the force of the fluid flow, as indicated by arrow 15, acting against it. The position of pig 13 can be tracked by pinger 35 located within the body 21 of pig 13. Pig 13 travels through pipeline 11, and at some point becomes stuck.

When the pig becomes stuck, the pressure increases within pipeline 11 due to the inhibited fluid flow. The pressure within pipeline 11 can be further increased up to the safe operating range. Referring to FIG. 2, pressure switch 45, located within high pressure capsule 31, is set to trigger at a specified pressure. Once the pressure in pipeline 11 reaches the specified pressure, sensor line 47 triggers pressure switch 45. Pressure switch 45, powered by battery 43, triggers solenoid valve 39, also powered by battery 43, causing it to open. Hydraulic oil, charged and stored in hydraulic accumulator 29, flows through line 38, through valve 39, and into control line 33. The hydraulic oil then flows through control line 33 and into hydraulic cutters 27.

Referring to FIGS. 1 and 3, when the hydraulic fluid enters cutters 27, the holes in cutters 27, through which locking rod 25 pass through collapse, cutting rod 25. With locking rod 25 no longer connected to housing 21, gate 23 is free to rotate about its axis 53. The force of the fluid on gate 23 causes it to rotate about its axis 53, and open (FIGS. 4 and 5). To prevent gate 23 from continuously rotating about axis 53, stopper rod 55 (FIGS. 1, 5, and 6) extends across internal cavity 22 through the center of body 21, parallel to axis 53 rearward of gate 23. Gate 23 presses against stopper 55, and maintains its open position, allowing flow to pass through internal cavity 22 and continue through pipeline 11. Pipeline pig 13 gives operators additional time to prepare for retrieval and possible repair while keeping the line in operation.

While the invention has been shown in only one of its forms, it should be apparent to those skilled in the art that it is not so limited but is susceptible to various changes without departing from the scope of the invention.

The invention claimed is:

1. A pig for movement within a pipeline comprising:
   a cylindrical housing;
   at least first and second annular elements circumferentially mounted to the housing and extending outwards for engagement with a pipeline;
   an internal flow cavity passing longitudinally through the housing;
   a gate capable of being opened, positioned within the internal flow cavity, obstructing flow through the internal flow cavity;
   a locking device connected to the gate, preventing it from being opened, the locking device being releasable to open the gate in the event the pig becomes stuck; and
   at least one cutter mounted adjacent the locking device for severing the locking device, thereby releasing the locking device and opening the gate.

2. The pig of claim 1 further comprising:
   a sensing device capable of receiving a signal indicating the pig is stuck, wherein the signal will activate the at least one cutter, severing the locking device, thereby releasing the locking device, and permitting the gate to open.

3. The pig of claim 2 wherein the sensing device comprises a pressure switch that senses pressure on an upstream end of the pig.

4. The pig of claim 2 wherein the sensing device is capable of receiving an electromagnetic signal from an operator to activate the at least one cutter.

5. The pig of claim 1 wherein the gate is capable of rotation about an axis perpendicular to the internal flow cavity.

6. The pig of claim 1 wherein the locking device comprises a rod that engages the gate.

7. The pig of claim 1 further comprising a hydraulic accumulator for storing hydraulic fluid connected to power the at least one cutter.

8. The pig of claim 1 further comprising a pinger mounted to the pig for tracking and locating the pig within the pipeline.

9. A pig for movement within a pipeline comprising:
   a cylindrical housing;
   at least first and second annular elements circumferentially mounted to the housing and extending outwards for engagement with the pipeline;
   an internal flow cavity passing longitudinally through the housing;
   a gate positioned within the internal flow cavity and mounted to a shaft that is perpendicular to the internal flow cavity, the gate and shaft being capable of rotation;
   a rod that passes through a hole in the gate to prevent the gate from rotating and opening;
   an unlocking device adjacent the rod; and
   a sensing device that senses when the pig is stuck in the pipeline and causes the unlocking device to release the rod.

10. The pig of claim 9 wherein the unlocking device comprises a cutter that severs the rod in response to receiving a signal from the sensing device.

11. The pig of claim 10 wherein the cutter is hydraulically powered.

12. The pig of claim 11 further comprising a hydraulic accumulator for storing hydraulic fluid and supplying hydraulic fluid to the cutter.

13. The pig of claim 9 further comprising a pinger mounted to the pig for tracking and locating the pig within the pipeline.

14. The pig of claim 9 wherein the sensing device comprises a pressure switch.

15. The pig of claim 9 wherein the sensing device is capable of receiving an electromagnetic signal from an operator to release the rod.

16. A method for deploying a pig within a pipeline comprising:
   (a) providing an internal cavity extending through the pig and placing a gate in the cavity, a locking device connected to the gate, preventing it from being opened, and at least one cutter mounted adjacent the locking device;
   (b) placing the pig in the pipeline with the gate locked in a closed position, allowing the flow of the fluid to drive the pig through the pipeline; and
   (c) if the pig becomes stuck in the pipeline, severing the locking device with the at least one cutter, thereby opening the gate to allow fluid to flow through the internal cavity.

17. The method according to claim 16, wherein step (c) further comprises:
   sending a signal to the pig if it becomes stuck, activating the at least one cutter and opening the gate.

* * * * *